G. TASMAN.
AUTOMOBILE SEAT.
APPLICATION FILED AUG. 28, 1919. RENEWED SEPT. 24, 1920.
1,357,743.
Patented Nov. 2, 1920.
2 SHEETS—SHEET 1.
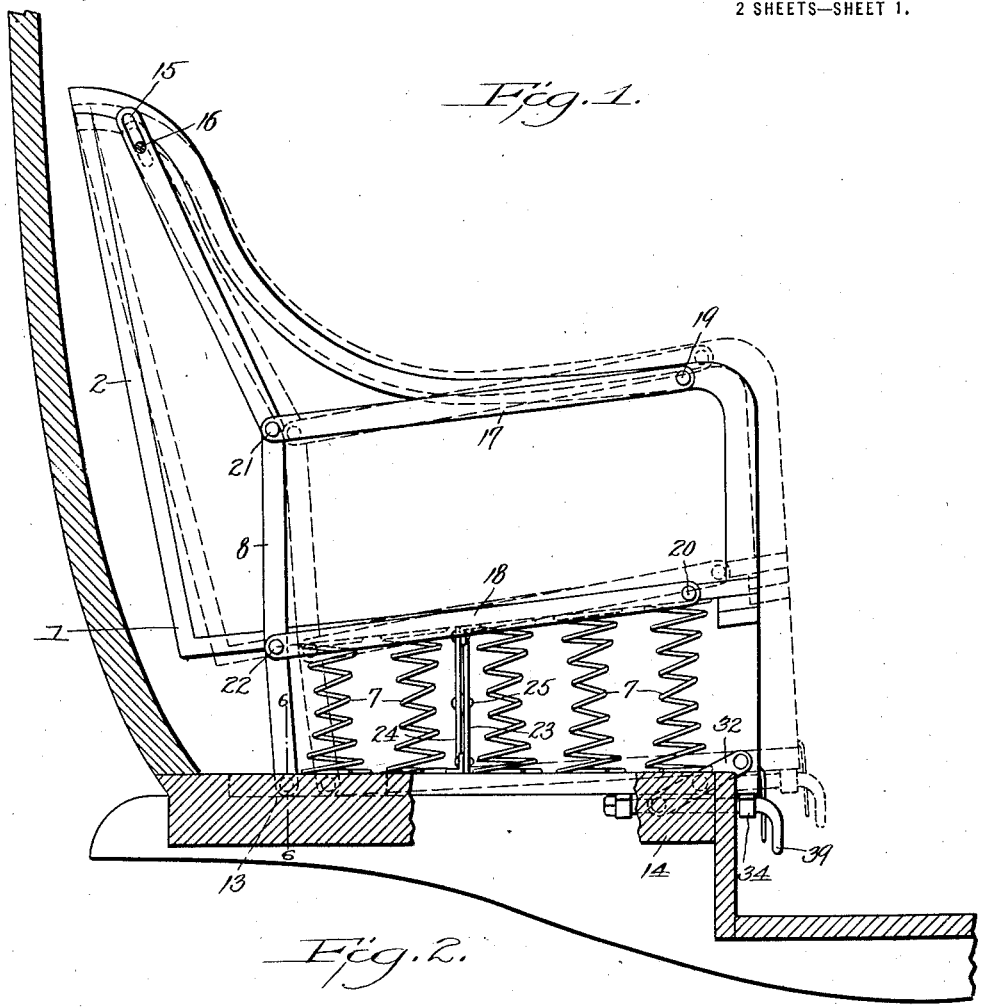
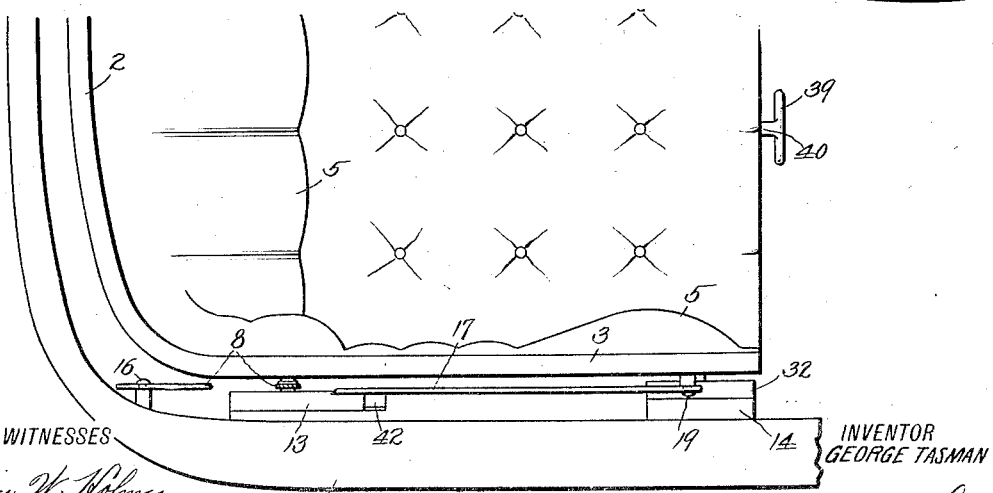
WITNESSES
Oliver W. Holmes
E. B. Gale
INVENTOR
GEORGE TASMAN
BY
ATTORNEYS G. TASMAN.
AUTOMOBILE SEAT.
APPLICATION FILED AUG. 28, 1919. RENEWED SEPT. 24, 1920.

1,357,743.

Patented Nov. 2, 1920.
2 SHEETS—SHEET 2.

WITNESSES
Oliver W. Holmes
E. B. Gale

INVENTOR
GEORGE TASMAN
BY
ATTORNEYS

UNITED STATES PATENT OFFICE.

GEORGE TASMAN, OF BROOKLYN, NEW YORK.

AUTOMOBILE-SEAT.

1,357,743.　　　　　Specification of Letters Patent.　　Patented Nov. 2, 1920.

Application filed August 28, 1919, Serial No. 320,510.　Renewed September 24, 1920. Serial No. 412,616.

*To all whom it may concern:*

Be it known that I, GEORGE TASMAN, a subject of Great Britain, having declared my intention to become a citizen of the United States, and a resident of the city of New York, borough of Brooklyn, in the county of Kings and State of New York, have invented a new and Improved Automobile-Seat, of which the following is a full, clear, and exact description.

This invention relates to a new and improved seat construction, and to a means for providing a spring suspension therefor, and is particularly adapted for use in automobiles, but it is understood that its use is not limited thereto.

Heretofore, in the construction of automobile seats, the spring suspension has been embodied directly under the upholstery of the seat portion. Such a construction permits a relative movement between the bottom or seat portion and the back of the seat. This is a source of discomfort in riding. Further, in the seats usually provided there is no means for obtaining angular adjustment of the seat.

One of the objects of this invention is to provide a seat and a means of yieldingly supporting or suspending the same, of simple and rugged construction, which will overcome the above mentioned objections.

A further object of this invention is to provide a seat construction in which there is substantially no relative movement between the seat and the back therefor, there being provided a means for yieldingly supporting said seat, and another means to permit the yielding support or springs to become effective, but to prevent the seat from tilting from its normal position.

Another object of this invention is to provide a means of simple construction for readily adjusting the angular position of the seat.

Still another object of this invention is to provide a construction for automobiles or other vehicles having its parts so arranged that the seat may be assembled and the upholstery applied thereto before the seat is placed in the vehicle. With such a construction a seat may be readily removed from the vehicle for any necessary repairs. A further advantage of such a removable seat construction, particularly for the back seat, is that if the rear part of the body has become injured in any manner, the back seat may be readily removed to permit repairs to be made to the injured portion of the body.

The above objects are accomplished by providing a construction having a seat and back having a relatively fixed relation, a base or bottom board spaced from the seat and having a suitable yielding means or spring support arranged between the seat and the base, there being provided a vertically extending member having the upper end thereof adjustably fixed to the body of the car, the lower end thereof suitably connected to the base.

A plurality of arms is provided for the vertically extending member, having one end of each of said arms pivotally connected at spaced points on the vertically extending member, the other end of each of said arms being pivotally connected at spaced points to the sides of the seat. It is understood that a vertically extending member is arranged one at each side of the seat. A compensating means is employed between the seat and the base to compensate for persons of different weight carried by the seat, the compensating means functioning to maintain the seat in a normal position relative to the base.

Other objects and advantages will be apparent from the following description and the accompanying drawings, in which similar characters of reference designate like parts in the several views.

Figure 1 is a side elevation view of the seat showing the body of the car partly broken away and in section. The position of the seat in a different angularly adjusted position is shown in the dash lines.

Fig. 2 is a top plan view of one side of the seat.

Figure 3:
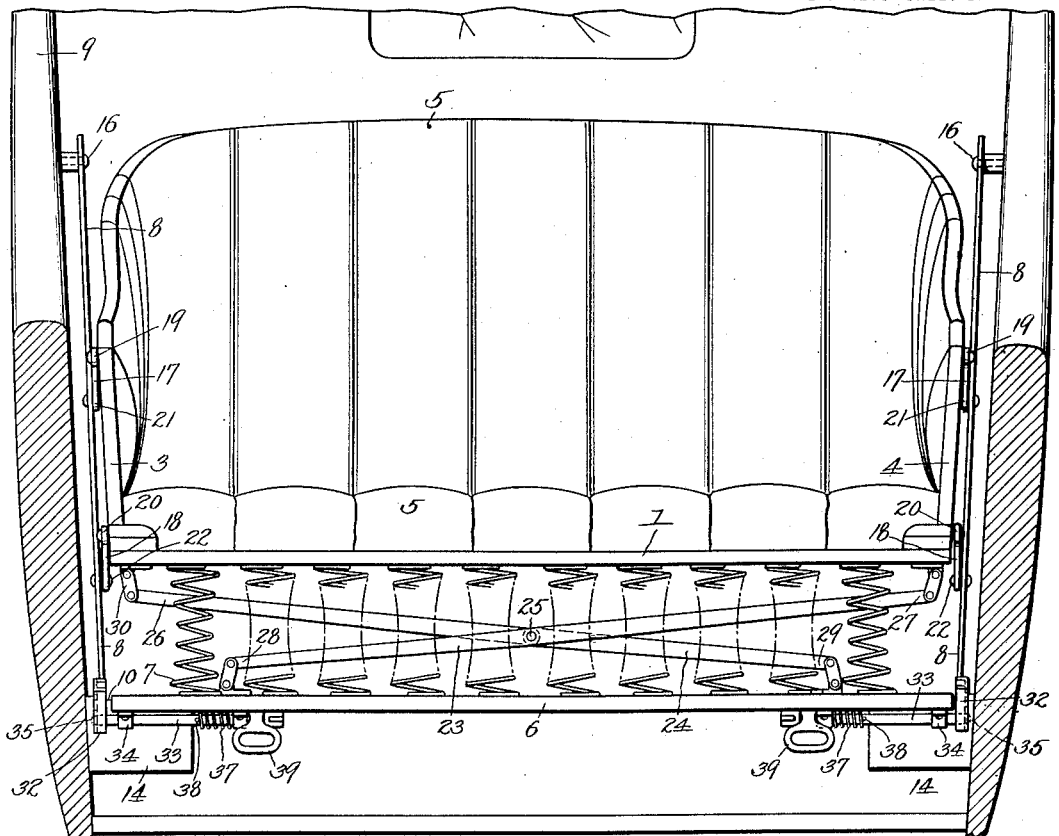
Fig. 3 is a front elevation of the seat, showing part of the body broken away and partly in section.
Figure 4:
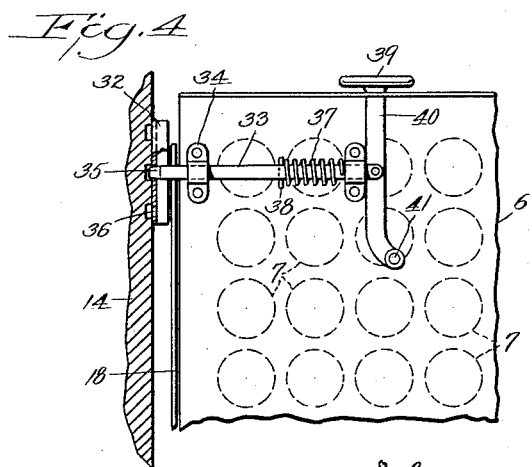
Fig. 4 is a bottom plan view of a fragment of the seat showing the means of securing the angular adjustment of the seat.

In the drawings showing a practical embodiment of the invention, the seat construction comprises a seat 1 and a back 2 having a relatively fixed relation, suitable sides 3—4 being provided. The seat, back and sides may be covered with any suitable cushions or upholstery 5. A base 6 is spaced from and arranged below the seat, any suitable spring means 7 being arranged therebetween for resiliently supporting a seat. If the seat were freely supported upon the springs 7, there would be a tendency for the seat to tilt when occupied. As a means of maintaining the seat in a normal position, and to prevent tilting when occupied, a means is provided to permit relative movement between the base and the seat, but to restrain the seat from tilting. Various arrangements may be provided to accomplish this result, but in the form shown, there is provided an upward or vertically extending member 8 having the lower end thereof connected to the base, and the upper end thereof adjustably connected to a relatively fixed support such as the body of the vehicle 9.

Figure 6:
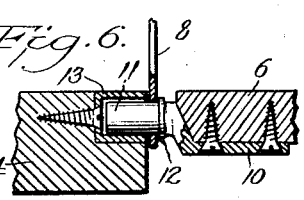
Fig. 6 is a detail broken sectional view partly in elevation, taken on the line 6—6 of Fig. 1, showing a preferred means of supporting the lower end of the vertically extending member and the rear end of the base relative to the body.

There is shown in Fig. 6 a detail of one of the methods for connecting the lower end of the member 8 to the base 6, a suitable bracket 10 is connected to the base, the said bracket having an arm 11 extending through an aperture 12 in the lower end of the member 8, the said arm extending within a guide or channel 13 formed in the frame 14 of the chassis of the vehicle. The purpose of such a construction is to permit movement of the base relative to the vehicle, to permit angular adjustment of the seat relative to the vehicle by a means later to be explained. As a means of adjustably supporting the upper end of the member 8, a slot 15 is provided in which is guided a stud 16 fixed to the body 9. Preferably, the frame 14 of the chassis is cut away to accommodate the base. It is thus seen that if the base is moved forward, the lower end of the member 8 will be moved therewith, and that the slot 15 will permit the upper end of the member 8 to move downwardly, said upper end being still held against movement by the stud 16. Other arms 17 and 18 coöperate with the vertically extending member 8 to prevent the tilting of the seat. In the form shown, one end of the arms is preferably connected at spaced points 19 and 20 to the side of the seat, the other end of said arms being pivotally connected at spaced points 21—22 to the member 8. A similar arrangement of the member 8, and the arms 17 and 18 is provided on each side of the seat. It is to be noted that such an arrangement permits vertical movement of the springs 7 to be effective in resiliently supporting the seat in that movement in a vertical direction but by reason of the arrangement provided, tilting of the seat is prevented, and the seat will move substantially in a plane parallel to that determined by the adjusted position of the member 8. In other words, if the points of pivotal support 21 and 22 are in a vertical position, the seat will oscillate upon the springs in a vertical plane, the said seat being restrained against tilting by reason of pivotal connection at the points 19 and 20 with the arms 17 and 18. With the member 8 rearranged at an angle, the seat would oscillate in a plane corresponding thereto.

In a seat freely supported on springs, there is a tendency in case the seat is occupied by one person who takes his position at one side of the seat, for the seat to tilt to one side due to the uneven distribution of weight. This tendency for side tilting movement is in a different direction than that heretofore noted. In order to overcome the tendency to tilt to the side under such conditions, a compensating means is provided which is arranged between the seat and the base. In the form shown, the compensating means comprises a plurality of members 23—24 having a pivotal connection 25 intermediate the ends, one end 26 and 27 of each of said members being pivotally connected at opposite sides of the seat, and the other end 28 and 29 being pivotally connected by a suitable means to opposite sides of the base. In the form shown, a link 30 is interposed between each end of the members 23 and 24, and the seat 1 and base 6 respectively, to effect the pivotal connection. It is thus seen that if a person occupies one side of the seat, the said compensating means will eliminate the tendency for the said side to tilt, but will maintain the seat and the base in a substantially parallel relation as the seat oscillates upon the springs 7.

By providing the link connection, it permits movement of the ends of the members 23 and 24 relative to the base and seat.

Figure 5:
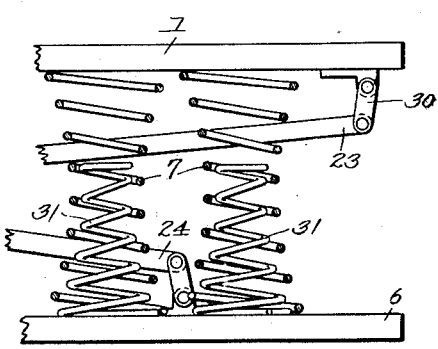
Fig. 5 is a fragmentary view showing the seat, the base board and part of the compensating device in elevation and one of the springs in section. A modified form of spring suspension is here shown to compensate for varying weights on the seat.

As a means of equalizing the effective spring pressure for the seat in accordance with the weight placed thereon, a spring suspension as shown in Fig. 5 is provided. The usual springs 7 are provided, which springs will respond to a relatively light weight upon the seat. Other supplementary springs 31 are provided which are effective only when a relatively heavy weight is upon the seat. If but one spring were provided the said spring would not produce the same spring effect for comfortable riding for a relatively light weight, as it would for a relatively heavy weight. By providing a plurality of springs, only one of which is effective for a light weight, a spring action is effected which permits comfortable riding for the light weight, and at the same time affords proper spring action for comfortable riding for the heavier weights.

As a means of adjusting the angular position of the base and seat, relative to the vehicle, the base 6 is made movable relative to the frame 14 of the chassis. Various arrangements may be used in order to effect the angular adjustments, but in the form shown, the said adjustment is obtained by elevating the front end of the base. For this purpose, a channel or guide 32 is fixed by any suitable means to the frame of the chassis, and arranged at an angle therein. A means carried by the base coöperates with the guide to hold the base in a certain angular position. In the form shown the said means comprises a spring pressed plunger 33 slidably carried on the base by the guides 34 or other suitable means, the end 35 of the plunger being guided within the channel or guide 32. Depressions 36 are spaced in the guide or channel 32 to receive the end 35, which is preferably tapered, of the plunger 33. A spring 37 interposed between one of the guides 34 and a pin 38 carried by the plunger, normally holds the end of the plunger seat, in the openings. As a means of conveniently changing the angular adjustment, a handle 39 is provided, the said handle being carried at the end of an arm 40, the other end of said arm having a pivotal connection. A suitable connection is established between the arm 40 and the spring pressed plunger so that the angular position of the base and seat may be changed by manipulation of the handle 39. In the form shown, the end of the plunger 33 is connected to the arm 40 between the ends thereof, so that by movement of the handle 39 about the pivotal point 41, the end of the plunger 33 will be disengaged from one of the openings 36, when the base may then be moved to the desired adjusted position.

Figure 7:
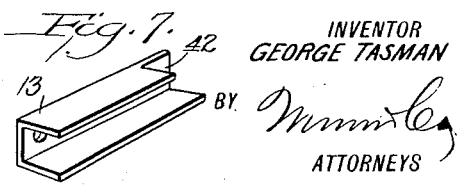
Fig. 7 is a perspective view of the guide or way.

It is to be noted that as the front end of the base is elevated, the arm 11 supporting the rear end of the base is moved within the guide or channel 13. As shown in Fig. 7, the channel 13 is substantially U shaped, having one end of the side portions cut away forming an opening 42 to facilitate the positioning of the seat by moving the base to the foremost position, by disengaging the connection at the upper end of the arms 8, and by withdrawing the plunger from the guide, it is to be noted that the entire seat construction may be removed as a self contained unit, at which time the arms 11 would be passed through the opening 42.

By providing a seat construction which may be moved as a unit, the seat may be assembled, and the upholstery applied thereto, before the seat is in the automobile. Further, in case of accident in which the rear portion of the vehicle is damaged, the seat construction may readily be removed to permit repair of the injured part of the vehicle.

From the above it is seen that there is herein provided a seat construction which is arranged and constructed to form a self contained unit which may be conveniently removed from the vehicle, said seat being angularly adjustable, and provided with a compensating means to prevent side tilting, another means to prevent forward tilting, and a spring suspension means to insure a comfortable spring action under varying weights.

While there has been shown herein a practical embodiment of the invention, it is understood that various changes and modifications may be made without departing from the spirit and scope of this invention.

I claim:

1. A device of the character described, comprising a seat and back having a relatively fixed relation, a base below and spaced from the seat, resilient means arranged between the seat and the base for yieldingly supporting a seat, a vertically extending member having one end thereof connected to the base, the other end thereof adapted to be connected to a relatively fixed support, and means having one end thereof pivotally connected to said vertically extending member and the other end thereof pivotally connected to the side of the seat to permit movement of said seat upon the spring members, but to restrain the seat against a tipping or tilting movement.

2. A device of the character described, comprising a seat and a back, a base spaced from the seat, means yieldingly supporting the seat arranged between the base and the seat, and pivotal means including a fixed support and a pivoted arm connecting the seat and support to prevent tilting of the seat.

3. A device of the character described, comprising a seat and a back, a base spaced from the seat, means yieldingly supporting the seat arranged between the base and the seat, and means to prevent tilting of the seat, said means including a member having a connection with the base at one part thereof and an adjustable connection at another part thereof with a relatively fixed support, and a plurality of arms having one end thereof pivotally connected at spaced points to the vertically extending member, the other end of said arms being pivotally connected at spaced points to the side of the seat.

4. A seat construction for vehicles, comprising a seat and back, a base, resilient means between the base and seat, and means including an angular guide for adjusting the base angularly relative to the vehicle.

5. A seat construction for vehicles, comprising a seat and back, means for adjusting the seat angularly relative to the vehicle, said means comprising a guide carried by the vehicle and angularly arranged thereon, and means for supporting one end of the seat at different points in said guide.

6. In a device of the character described, comprising a seat and back having a relatively fixed relation and means resiliently supporting said seat, a pivotal means including a link member having one end pivotally connected to the seat to prevent tilting of the seat with a rocking movement of the seat on said resilient means.

7. In a device of the character described, comprising a seat and back having a relatively fixed relation and means resiliently supporting said seat, a means to prevent tilting of the seat with a rocking movement of the seat on said resilient means, said means including a vertically extending member and a plurality of arms, one end of each of said arms having a pivotal connection at spaced points with said member, the other end of said arms having a pivotal connection with the seat.

8. In a device of the character described comprising a seat and back having a relatively fixed relation, means spaced from the seat, resilient supporting means between the seat and said spaced member, pivotal means for preventing a forward tilting of the seat and adjustable means including a guide for changing the angularity of the spaced member.

9. A seat construction for vehicles comprising a seat and a back having a relatively fixed relation, a base below the seat, springs interposed between the base and the seat, means connecting the base and the seat to permit relative movement between the seat and the base, but restraining the said seat against a forward tilting, said means including a relatively fixed member and a plurality of arms having the end of each arm pivotally connected with the seat and fixed member respectively.

10. A seat construction for vehicles comprising a seat and a back having a relatively fixed relation, a base below the seat, springs interposed between the base and the seat, pivotal means connecting the base and the seat to permit relative movement between the seat and the base, but restraining the said seat against a forward tilting, the said seat construction being self contained and independently removable as a unit from the vehicle.

11. A seat construction for vehicles comprising a seat and back having a fixed relation, a base, spaced below the seat, means arranged between the seat and base for resiliently supporting the seat, and means to prevent a tilting of the seat, said means including a vertically extending member having a pivotal connection with the base, and an arm having a pivotal connection with said member and said seat, the upper end of said vertically extending member being connected to a relatively fixed support.

12. A seat construction for a vehicle comprising a seat and back having a fixed relation, a pivotal spring support therefor, and means restraining the seat against a tilting movement.

13. A seat construction for a vehicle comprising a seat and back having a fixed relation, a spring support therefor, and means restraining the seat against a tilting movement, said means including a plurality of arms having a pivotal connection at spaced points with the seat, at one part of the arm, the said arms having a pivotal connection at spaced points with a relatively fixed support.

14. A seat construction for vehicles comprising a back and a seat having a fixed relation, a base, a spring support arranged between the seat and base, means restraining the seat against a tilting movement said means comprising an upwardly extending member having the lower end thereof pivotally connected to the base, the upper end of said member being adjustably fixed to the vehicle, a plurality of arms having one end thereof pivotally connected at spaced points to one side of the seat, and a means for adjusting the angular position of the base.

15. A seat construction for vehicles comprising a back and seat having a fixed relation, a base, a spring support arranged between the seat and base, means restraining the seat against a tilting movement said means comprising an upwardly extending member having the lower end thereof pivotally connected to the base, the upper end of said member being adjustably fixed to the vehicle, a plurality of arms having one end thereof pivotally connected at spaced points to one side of the seat, and a means for adjusting the angular position of the base, said means comprising an inclined guide arranged in the vehicle body, a spring pressed plunger carried by the base, having one end thereof extending in said guide, and a handle for actuating said plunger.

16. A seat construction for vehicles comprising a seat and back having a fixed relation, a base, means arranged between the base for resiliently carrying the seat, and means for adjusting the angle of the base relative to the vehicle, said means comprising a support rigid with the vehicle body, and a member carried by the base, adjustable in said support.

17. A seat construction for vehicles comprising a seat and back having a fixed relation, means for resiliently supporting the seat, pivotal means restraining the seat against a forward or rearward tilting, and a pivotal means restraining the seat against side tilting.

GEORGE TASMAN.